(12) United States Patent
Takahashi et al.

(10) Patent No.: US 12,177,886 B2
(45) Date of Patent: Dec. 24, 2024

(54) TERMINAL AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Lihui Wang, Beijing (CN); Xiaohong Zhang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 329 days.

(21) Appl. No.: 17/765,882

(22) PCT Filed: Oct. 3, 2019

(86) PCT No.: PCT/JP2019/039180
§ 371 (c)(1),
(2) Date: Apr. 1, 2022

(87) PCT Pub. No.: WO2021/064956
PCT Pub. Date: Apr. 8, 2021

(65) Prior Publication Data
US 2022/0369328 A1 Nov. 17, 2022

(51) Int. Cl.
*H04W 72/566* (2023.01)
*H04L 1/00* (2006.01)
(Continued)

(52) U.S. Cl.
CPC ......... *H04W 72/569* (2023.01); *H04L 1/0026* (2013.01); *H04L 5/0057* (2013.01); *H04W 24/10* (2013.01); *H04W 72/23* (2023.01)

(58) Field of Classification Search
None
See application file for complete search history.

(56) References Cited

U.S. PATENT DOCUMENTS

2019/0132824 A1* 5/2019 Jeon ........................ H04L 5/00
2019/0159219 A1   5/2019 Hosseini et al.
(Continued)

FOREIGN PATENT DOCUMENTS

CN         103004116 A   *  3/2013   ........... H04L 1/0027
WO PCT/KR2018/004974    *  1/2018
(Continued)

OTHER PUBLICATIONS

Author Unknown, Clarification of PUSCH with SP-CSI overlapping with PUSCH with data, Doc. No R1-1909886, pp. 1-3, Aug. 30 (Year: 2019).*
(Continued)

*Primary Examiner* — Christopher M Crutchfield
(74) *Attorney, Agent, or Firm* — Osha Bergman Watanabe & Burton LLP

(57) ABSTRACT

A terminal according to an aspect of the present disclosure includes: a control section that determines a priority of a channel state information (CSI) report based on at least one of a type of downlink control information triggering the CSI report, a parameter used for transmission of the downlink control information, or presence or absence of uplink (UL) data allocated to an uplink shared channel used for transmission of the CSI report; and a transmitting section that transmits, in a case where transmission of the CSI report and transmission of another UL signal overlap with each other, one of the CSI report and the another UL signal based on the priority.

7 Claims, 8 Drawing Sheets

(51) Int. Cl.
H04L 5/00 (2006.01)
H04W 24/10 (2009.01)
H04W 72/23 (2023.01)

(56) References Cited

U.S. PATENT DOCUMENTS

| | | | |
|---|---|---|---|
| 2019/0246420 A1* | 8/2019 | Park | H04W 72/23 |
| 2020/0067584 A1* | 2/2020 | Kang | H04W 72/23 |
| 2021/0105055 A1* | 4/2021 | Chae | H04L 5/0026 |
| 2022/0141808 A1* | 5/2022 | Xu | H04W 72/23 |
| | | | 370/329 |
| 2022/0159667 A1* | 5/2022 | Zhang | H04W 72/0453 |
| 2022/0321276 A1* | 10/2022 | Islam | H04W 72/21 |

FOREIGN PATENT DOCUMENTS

| | | | |
|---|---|---|---|
| WO | PCT/CN2019/101219 | * | 2/2021 |
| WO | PCT/CN2019/110210 | * | 11/2021 |

OTHER PUBLICATIONS

International Search Report issued in PCT/JP2019/039180 on Apr. 14, 2020 (2 pages).
Written Opinion of the International Searching Authority issued in PCT/JP2019/039180 on Apr. 14, 2020 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In an existing LTE system (for example, LTE Rel. 8 to 15), an uplink signal is mapped to an appropriate radio resource and transmitted from a UE to a base station. Uplink user data (for example, UL-SCH) is transmitted by using an uplink shared channel (physical uplink shared channel (PUSCH)). Furthermore, uplink control information (UCI) is transmitted by using the PUSCH when transmitted together with uplink user data, and by using an uplink control channel (physical uplink control channel (PUSCH)) when transmitted individually.

Channel state information (CSI) included in the UCI is information based on an instantaneous downlink channel state, and is, for example, a channel quality indicator (CQI), a precoding matrix indicator (PMI), a precoding type indicator (PTI), a rank indicator (RI), or the like. The UE notifies the base station of the CSI periodically, aperiodically, or semi-persistently.

Periodic CSI (P-CSI) is CSI periodically transmitted by the UE based on a period and/or a resource notified from the base station. On the other hand, aperiodic CSI (A-CSI) is transmitted by the UE in response to a CSI report request (also referred to as a trigger, a CSI trigger, a CSI request, or the like) from the base station. The CSI report request is transmitted by downlink control information (DCI), for example.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

Future radio communication systems (for example, 5G (5th generation mobile communication system) and NR (New Radio)) are assumed to support a plurality of traffic types such as further advancement of mobile broadband (enhanced mobile broadband (eMBB)), machine-type communication that achieves multiple simultaneous connections (massive machine type communications (mMTC)), highly-reliable and low-latency communication (ultra-reliable and low-latency communications (URLLC)), and the like. For example, the URLLC requires higher delay reduction than the eMBB and higher reliability than the eMBB.

In this manner, in the NR, various traffic types with different requirements (for example, the eMBB, the URLLC, and the like) are assumed. In addition, it is also assumed that a DCI type or DCI transmission parameter corresponding to each traffic type is defined, and scheduling of data corresponding to each traffic type, triggering of a CSI report, or the like is controlled using given DCI.

In a case where different types of DCI or different transmission parameters are used to trigger UL transmission (for example, data, a CSI report, or the like) corresponding to each traffic type, it is conceivable that multiple UL transmissions collide with each other. However, how to handle the collision between the UL transmissions has not been sufficiently studied yet.

Therefore, an object of the present disclosure is to provide a terminal and a radio communication method capable of appropriately controlling UL transmission even in a case where multiple UL transmissions collide with each other in a future radio communication system.

Solution to Problem

A terminal according to an aspect of the present disclosure includes: a control section that determines a priority of a channel state information (CSI) report based on at least one of a type of downlink control information triggering the CSI report, a parameter used for transmission of the downlink control information, or the presence or absence of uplink (UL) data allocated to an uplink shared channel used for transmission of the CSI report; and a transmitting section that transmits, in a case where transmission of the CSI report and transmission of another UL signal overlap with each other, one of the CSI report and the another UL signal based on the priority.

Advantageous Effects of Invention

According to an aspect of the present disclosure, it is possible to appropriately control UL transmission even in a case where multiple UL transmissions collide with each other in a future radio communication system.

DESCRIPTION OF EMBODIMENTS

Figure 1:
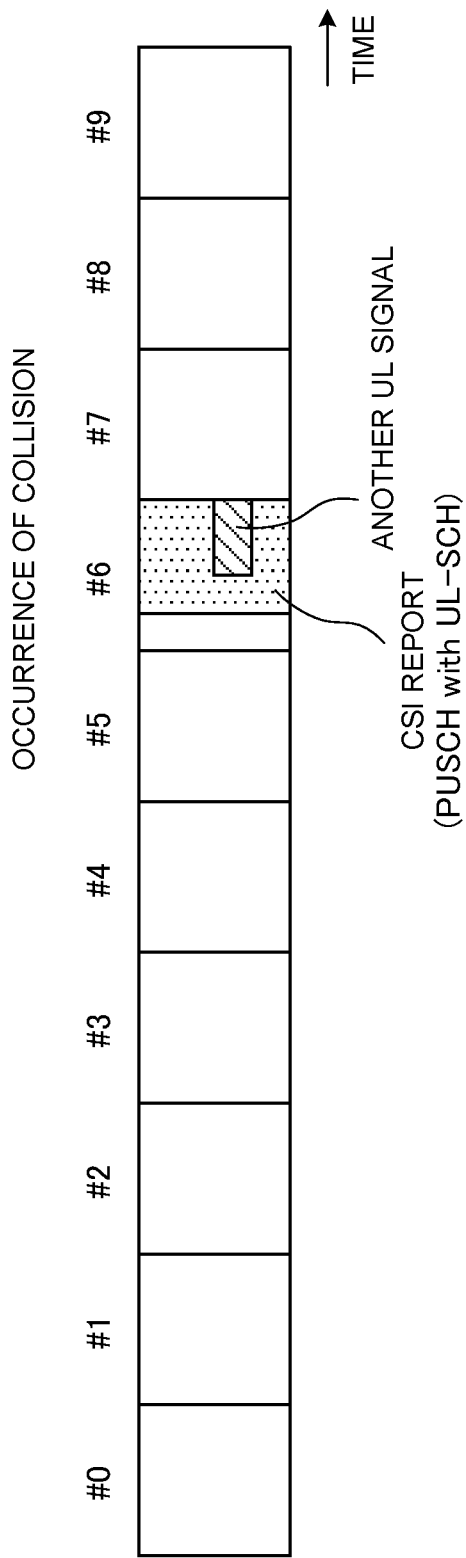
FIG. 1 is a diagram illustrating an example of a case where a channel state information (CSI) report collides with another UL signal.

In an existing LTE system (for example, Rel. 10 to 15), a reference signal for measuring a channel state in downlink is defined. The reference signal for channel state measurement is also referred to as a cell-specific reference signal (CRS) or a channel state information-reference signal (CSI-RS), and is a reference signal used for measuring CSI, such as a channel quality indicator (CQI), a precoding matrix indicator (PMI), or a rank indicator (RI), as a channel state.

A UE feeds back, to a base station (a network, an eNB, a gNB, a transmitting/receiving point, or the like), a measurement result as a CSI report based on the reference signal (CSI-RS) for channel state measurement. In an existing system (for example, Rel. 15), a periodic CSI report (P-CSI), a CSI report using a semi-persistently designated resource (SP-CSI report), and an aperiodic CSI report (A-CSI) are defined as CSI feedback methods.

Meanwhile, in New Radio (NR), it is assumed to support a plurality of traffic types (alternatively, use cases or service types). Examples of the plurality of traffic types include further advancement of mobile broadband (enhanced mobile broadband (eMBB)), machine-type communication that achieves multiple simultaneous connections (massive machine type communications (mMTC)), highly-reliable and low-latency communication (ultra-reliable and low-latency communications (URLLC)), and the like. For example, the URLLC requires higher delay reduction than the eMBB and higher reliability than the eMBB.

<Traffic Type>

Future radio communication systems (for example, NR) are expected to involve traffic types (also referred to as services, service types, communication types, use cases, or the like) such as further advancement of mobile broadband (for example, eMBB), machine-type communication that achieves multiple simultaneous connections (for example, mMTC and Internet of Things (IoT)), and highly-reliable and low-latency communications (for example, URLLC). For example, it is required that the URLLC have smaller latency and higher reliability than the eMBB.

The traffic type may be identified in a physical layer based on at least one of the followings.

Logical channels with different priorities

Modulation and coding scheme (MCS) table (MCS index table)

Channel quality indication (CQI) table

DCI format

System information-radio network temporary identifier (RNTI) used for scrambling (masking) of cyclic redundancy check (CRC) bit included in (added to) DCI (DCI format)

Radio resource control (RRC) parameter

Specific RNTI (for example, RNTI for URLLC, MCS-C-RNTI, or the like)

Search Space

Given field in DCI (for example, newly added field or reuse of existing field)

Specifically, a traffic type of hybrid automatic repeat request acknowledgement (HARQ-ACK) for a physical downlink shared channel (PDSCH) may be determined based on at least one of the following.

MCS index table used to determine at least one of modulation order, target code rate, or transport block size (TBS) of PDSCH (for example, whether to use MCS index table 3)

RNTI used for CRC scrambling of DCI used for scheduling of PDSCH (for example, whether CRC scrambling is performed using C-RNTI or using MCS-C-RNTI)

A traffic type of a scheduling request (SR) may be determined based on a higher layer parameter used as an SR identifier (SR-ID). The higher layer parameter may indicate whether the traffic type of the SR is eMBB or URLLC.

A traffic type of the CSI may be determined based on configuration information regarding the CSI report (CSIreportSetting), the DCI type used for triggering, a DCI transmission parameter, or the like. The configuration information, the DCI type, or the like may indicate whether the traffic type of the CSI is eMBB or URLLC. The configuration information may be a higher layer parameter.

A traffic type of the PUSCH may be determined based on at least one of the following.

MCS index table used to determine at least one of modulation order, target code rate, or TBS of PUSCH (for example, whether to use MCS index table 3).

RNTI used for CRC scrambling of DCI used for scheduling of PUSCH (for example, whether CRC scrambling is performed using C-RNTI or using MCS-C-RNTI)

The traffic type may be associated with communication requirements (requirements such as a latency and an error rate), a data type (voice, data, or the like), or the like.

URLLC requirements and eMBB requirements may be different in that the URLLC is lower in latency than the eMBB or the URLLC requirements include a reliability requirement.

For example, eMBB user (U)-plane latency requirements may include that a downlink U-plane latency is 4 ms and that an uplink U-plane latency is 4 ms. On the other hand, URLLC U-plane latency requirements may include that the downlink U-plane latency is 0.5 ms and that the uplink U-plane latency is 0.5 ms. Furthermore, the URLLC reliability requirements may include that a 32-byte error rate is $10^{-5}$ for a U-plane latency of 1 ms.

In contrast, enhancement of the reliability of traffic for unicast data is mainly studied as enhanced ultra reliable and low latency communications (eURLLC). Hereinafter, in a case where the URLLC and the eURLLC are not distinguished, they are simply referred to as URLLC.

As described above, in a future radio communication system (for example, Rel. 16 or later), it is considered to define the DCI type or DCI transmission parameter corresponding to each traffic type. In such a case, it is also assumed that scheduling of data corresponding to each traffic type, triggering of a CSI report, or the like is controlled using given DCI.

The DCI type may be a DCI format. The DCI transmission parameter may be various parameters (for example, an RNTI type, a control resource set, or a search space to be applied) used for DCI transmission.

For example, in Rel. 16 and later, it is considered that a new DCI format or the like used for at least one of scheduling of data for a specific traffic type (for example, the URLLC) or the CSI report is supported.

In a case where different types of DCI or different transmission parameters are used to schedule or trigger UL transmission (for example, data, a CSI report, or the like) corresponding to each traffic type, it is conceivable that multiple UL transmissions (for example, transmission timing or resource) collide with each other. In such a case, how to control the collision between the UL transmissions becomes a problem.

In addition, in a case where the CSI (for example, A-CSI) triggered by the DCI is transmitted using the uplink shared channel (for example, the PUSCH), there are a case where UL data (for example, the UL-SCH) is allocated to the PUSCH and a case where the UL data is not allocated to the PUSCH. In such a case, how to control a priority of the CSI report becomes a problem.

The present inventors have focused on the fact that DCI corresponding to a given traffic type is supported, have studied a control method when the CSI report collides with another UL signal (which may be replaced with a UL channel) based on the DCI type, the transmission parameter, or the like, and have conceived an aspect of the present invention.

In addition, the present inventors have focused on the fact that there are a case where the UL data (for example, the UL-SCH) is allocated to the PUSCH used for transmission of the CSI report and a case where the UL data is not allocated to the PUSCH, have studied the priority (for example, the priority at the time of collision) of the CSI report in each case, and have conceived an aspect of the present invention.

Hereinafter, embodiments according to the present disclosure will be described in detail with reference to the drawings. A radio communication method according to each embodiment may be applied independently, or may be applied in combination with others.

In the present specification, the "collision" represents, but is not limited to, that a plurality of signals and/or channels are transmitted (scheduled) on the same time resource (for example, at least one of the same slot and symbol). For example, the "collision" may represent that a plurality of signals and/or channels are transmitted on a radio resource (for example, overlapping time and frequency resources) in which at least the time resource overlaps.

Note that a unit of the time resource is not limited to the slot, and may be replaced with a mini slot, a subslot, a symbol, a subframe, or the like. In addition, in the following description, it is assumed that the CSI is the aperiodic CSI (A-CSI), but the CSI is not limited thereto.
(First Aspect)

In a first aspect, an example of a UE operation in a case where a transmission timing of the CSI report triggered by the DCI and a transmission timing of another UL signal (or UL channel) overlap with each other will be described.

In a case where different UL transmissions overlap with each other, the UE may perform control in such a manner that any UL transmission is performed and no other UL transmission is performed (for example, dropped) based on a priority of each UL transmission.

The UE may determine the priority of the CSI report based on at least one of the type of the DCI that triggers the CSI report, information (for example, a parameter used for transmission of the DCI or information included in the DCI) obtained from the DCI, or whether or not the UL data (for example, the UL-SCH) is allocated to the PUSCH used to transmit the CSI report.

For example, it is assumed that the CSI triggered by the DCI format used for UL scheduling of a first traffic type (for example, URLLC) is transmitted on the PUSCH including the UL data (alternatively, the PUSCH to which the UL data is allocated). In such a case, the UE may determine that the priority of the CSI report is set to the same priority as the scheduled UL data (for example, the PUSCH to which data for the URLLC is allocated).

The DCI format used for UL scheduling of the first traffic type may be a new DCI format that is not defined in the existing system (for example, Rel. 15). The new DCI format may have a configuration in which the size of one or more fields included in the DCI can be changed (or variable).

FIG. 1 illustrates an example of a case where transmission of a CSI report triggered by a given DCI type (for example, a new DCI format) and transmitted on a PUSCH including UL data collides with transmission of another UL signal (or UL channel). In such a case, the UE controls the transmission based on the priority of the CSI report and the priority of another UL signal.

Figure 2:
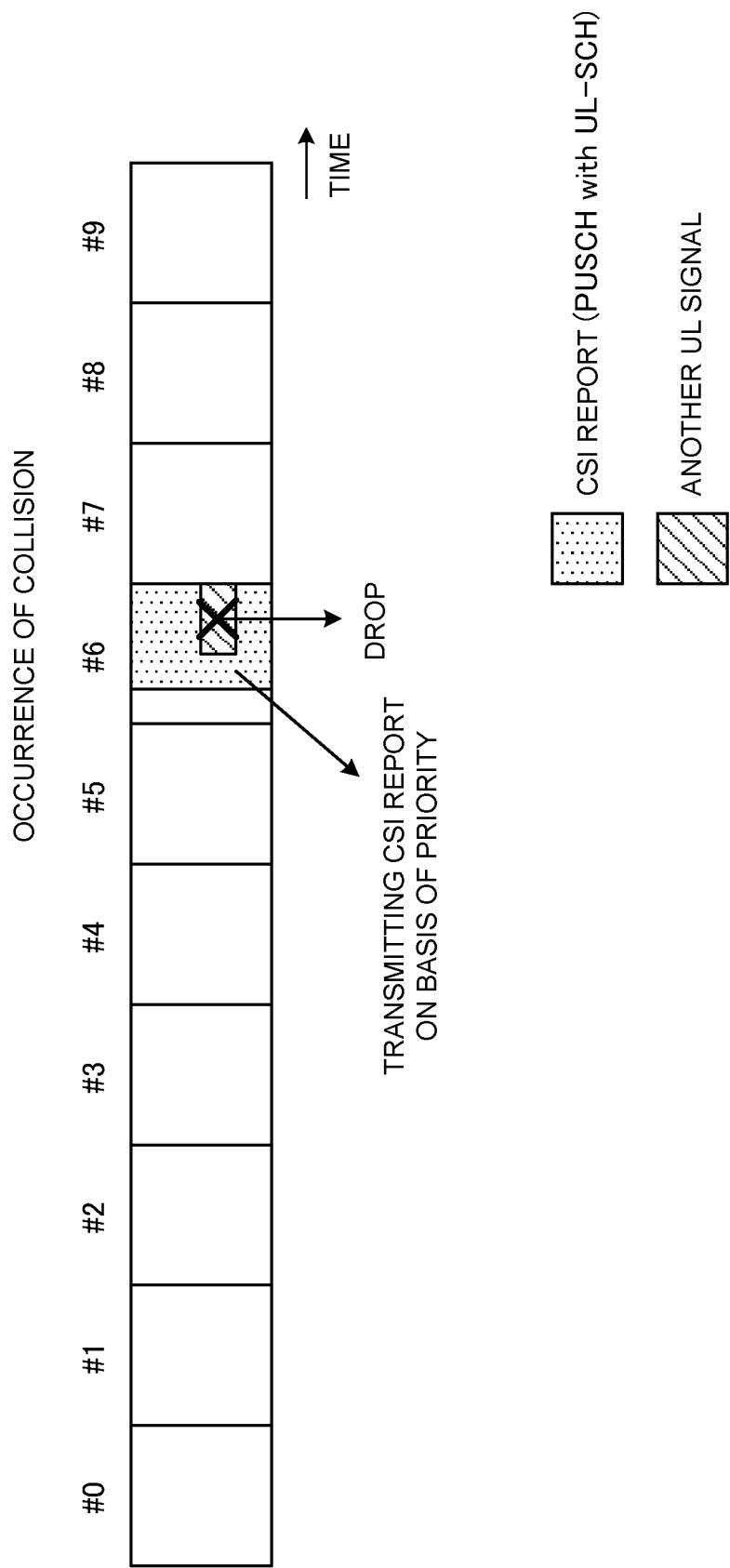
FIG. 2 is a diagram illustrating an example of a UE operation in a case where the CSI report collides with another UL signal.

In a case where the priority of the CSI report is higher than the priority of another UL signal, the UE may perform control in such a manner that the CSI report (or the PUSCH for the first traffic type that includes the CSI report) is transmitted and another UL signal is not transmitted (or dropped) (see FIG. 2).

Another UL signal (or channel) having a lower priority than the CSI report may be, for example, UL transmission (for example, at least one of the PUSCH, a physical uplink control channel (PUCCH), a sounding reference signal (SRS), or the CSI report) for a second traffic type (for example, eMBB). The UL transmission for the second traffic type may be scheduled or triggered by a DCI format different from the DCI format used for scheduling of the first traffic type.

In this way, by setting the priority of CSI report triggered by the DCI corresponding to a specific traffic type (alternatively, a given DCI type or the DCI to which the transmission parameter is applied) to be higher than the priority of a given UL signal or UL channel of another traffic type, a latency of the CSI report of the specific traffic type can be suppressed.

Figure 3:
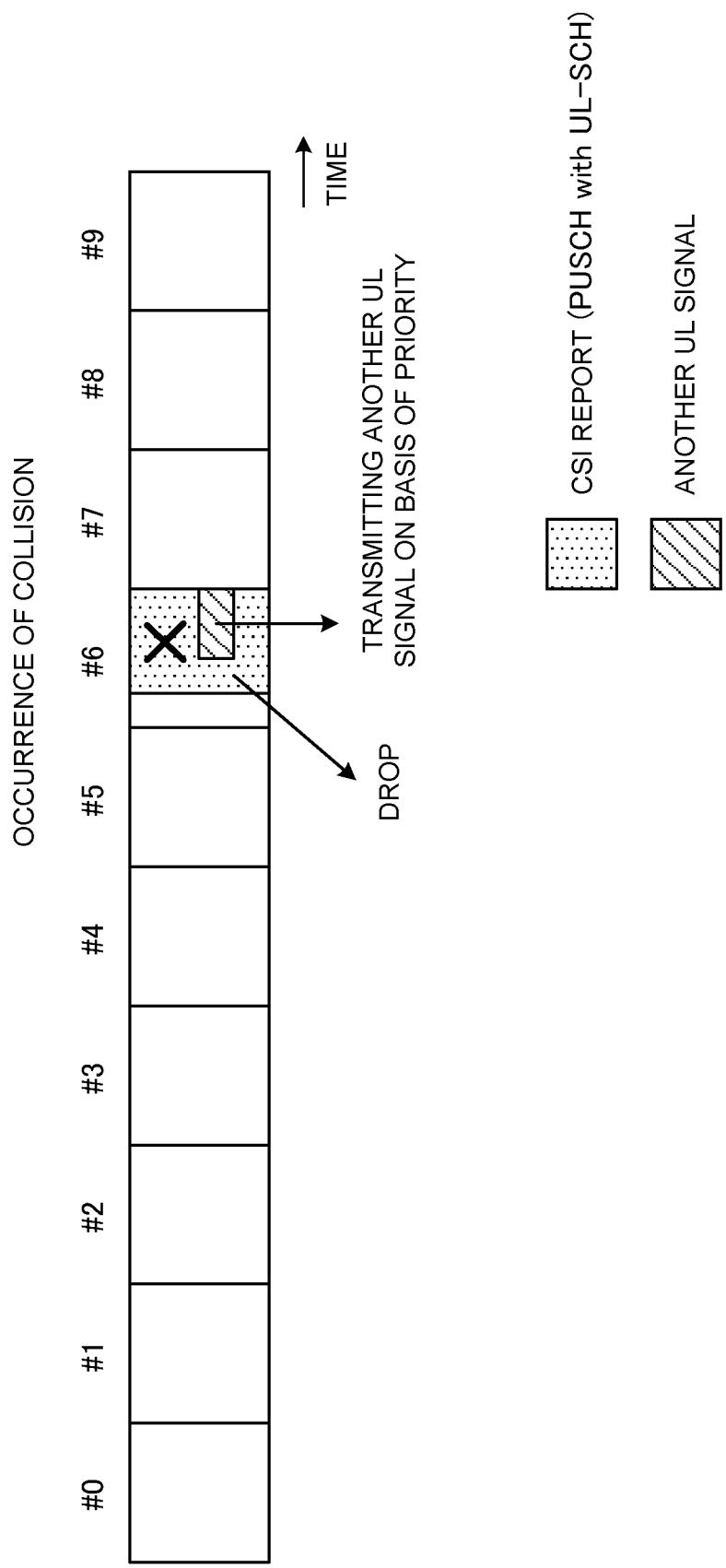
FIG. 3 is a diagram illustrating another example of the UE operation in a case where the CSI report collides with another UL signal.

On the other hand, in a case where the priority of the CSI report is lower than the priority of another UL signal, the UE may perform control in such a manner that another UL signal is transmitted and the CSI report is not transmitted (for example, the CSI report is dropped or the transmission timing is delayed) (see FIG. 3).

Another UL signal (or channel) having a lower priority than the CSI report may be, for example, a random access channel (PRACH). For example, regardless of the corresponding traffic type, the priority of PRACH transmission may be higher than the priority of the CSI report (or the PUSCH of the first traffic type that includes the CSI report).

Alternatively, the priority of the PRACH transmission corresponding to the first traffic type may be higher than the priority of the CSI report corresponding to the first traffic type, and the priority of the PRACH transmission corresponding to the second traffic type may be lower than the priority of the CSI report corresponding to the first traffic type.

Note that, in the above description, scheduling of the PUSCH or triggering of the CSI report corresponding to the first traffic type is controlled based on the DCI format (for example, the new DCI format), but the present invention is not limited thereto. For example, at least one of the following Options 1 to 4 (or a combination thereof) may be used to perform PUSCH scheduling or CSI report triggering corresponding to a specific traffic type (for example, the first traffic type).

Option 1: Specific DCI format
Option 2: RNTI type
Option 3: Explicit notification by DCI
Option 4: At least one of control resource set or search space used for DCI transmission For example, a physical downlink control channel (PDCCH) (or DCI) that is subjected to CRC-scrambling with a specific RNTI type may be used to perform PUSCH scheduling or CSI report triggering corresponding to the specific traffic type. Alternatively, a new field or an existing field included in the DCI may be used to perform PUSCH scheduling or CSI report triggering corresponding to the specific traffic type.

Note that, in the above description, the priority of the CSI report triggered by the DCI corresponding to the first traffic type and transmitted on the PUSCH including the UL data is set to be the same as the priority of the UL data, but the present invention is not limited thereto. The priority may be determined based on the traffic type (alternatively, the DCI type used for scheduling or triggering, or the like) and the type of a signal.

(Second Aspect)

In a second aspect, another example of the UE operation in a case where the transmission timing of the CSI report triggered by the DCI and the transmission timing of another UL signal (or UL channel) overlap with each other will be described. Specifically, in the second aspect, a case where the CSI report is transmitted using the PUSCH that does not include the UL data (for example, the PUSCH to which the UL data is not allocated) will be described.

For example, it is assumed that the CSI triggered by the DCI format used for UL scheduling of the first traffic type (for example, URLLC) is transmitted on the PUSCH that does not include the UL data (alternatively, the PUSCH to which the UL data is not allocated). In such a case, the priority of the CSI report may be set to be the same as the priority of the CSI report including the UL data, or may be set separately from the priority of the CSI report including the UL data.

<Priority Setting 1>

The UE may determine that the priority of CSI report (without the UL-SCH) scheduled by the DCI corresponding to the first traffic type is set to be the same as the priority of the PUSCH scheduled by the DCI corresponding to the first traffic type.

The DCI format used for UL scheduling of the first traffic type may be a new DCI format that is not defined in the existing system (for example, Rel. 15). The new DCI format may have a configuration in which the size of one or more fields included in the DCI can be changed (or variable).

Figure 4:
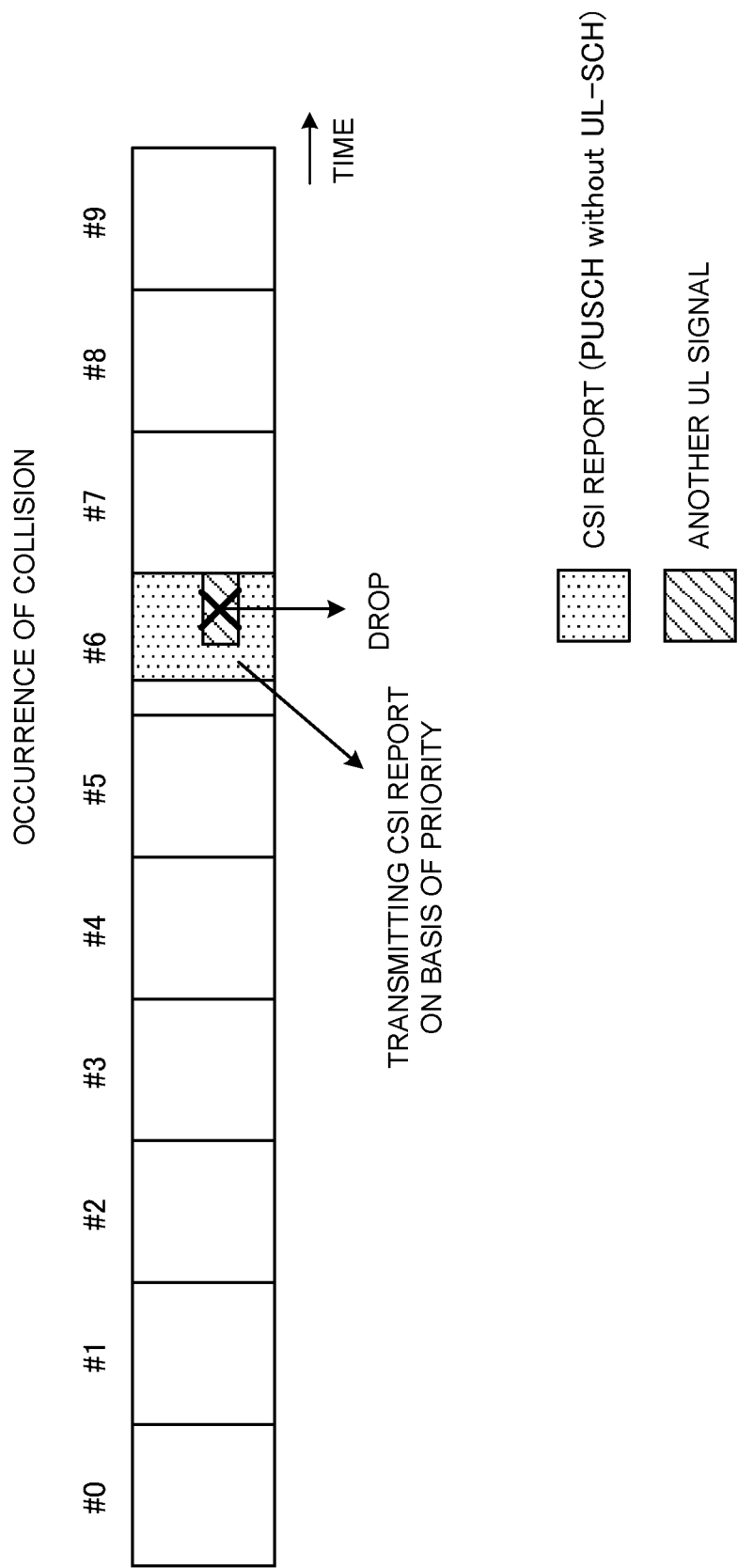
FIG. 4 is a diagram illustrating another example of the UE operation in a case where the CSI report collides with another UL signal.

FIG. 4 illustrates an example of a case where transmission of the CSI report triggered by the given DCI type (for example, the new DCI format) and transmitted on the PUSCH that does not include the UL data collides with transmission of another UL signal (or UL channel). In such a case, the UE controls the transmission based on the priority of the CSI report and the priority of another UL signal.

Here, a case where the priority of the CSI report is higher than the priority of another UL signal is illustrated. In such a case, the UE may perform control in such a manner that the CSI report (alternatively, the CSI report without the UL-SCH) is transmitted and another UL signal is not transmitted (for example, dropped) (see FIG. 4).

Another UL signal (or channel) having a lower priority than the CSI report may be, for example, UL transmission (for example, at least one of the PUSCH, a physical uplink control channel (PUCCH), a sounding reference signal (SRS), or the CSI report) for a second traffic type (for example, eMBB). The UL transmission for the second traffic type may be scheduled or triggered by a DCI format different from the DCI format used for scheduling of the first traffic type.

In this way, by setting the priority of CSI report triggered by the DCI corresponding to a specific traffic type (alternatively, a given DCI type or the DCI to which the transmission parameter is applied) to be higher than the priority of a given UL signal or UL channel of another traffic type, a latency of the CSI report of the specific traffic type can be suppressed.

On the other hand, in a case where the priority of the CSI report is lower than the priority of another UL signal, the UE may perform control in such a manner that another UL signal is transmitted and the CSI report is not transmitted (for example, the CSI report is dropped or the transmission timing is delayed).

Another UL signal (or channel) having a lower priority than the CSI report may be, for example, a random access channel (PRACH). For example, regardless of the corresponding traffic type, the priority of PRACH transmission may be higher than the priority of the CSI report (alternatively, the CSI report without the UL-SCH).

Alternatively, the priority of the PRACH transmission corresponding to the first traffic type may be higher than the priority of the CSI report corresponding to the first traffic type, and the priority of the PRACH transmission corresponding to the second traffic type may be lower than the priority of the CSI report corresponding to the first traffic type.

<Priority Setting 2>

The UE may determine that the priority of the CSI report (without the UL-SCH) scheduled by the DCI corresponding to the first traffic type is set to be the same as the priority of the aperiodic CSI (A-CSI) report in the existing system (for example, Rel. 15). That is, the UE applies the priority of the A-CSI (or A-CSI triggered by UL grant) defined in the existing system regardless of the DCI format used for triggering.

In a case where transmission of the CSI report triggered by the given DCI type (for example, the new DCI format) and transmitted on the PUSCH that does not include the UL data collides with transmission of another UL signal (or UL channel), the UE controls the transmission according to the following priority defined in Rel. 15.

PRACH>SR/HARQ-ACK>A-CSI>SP-CSI>P-CSI>PUSCH

For example, in a case where the priority of the CSI report (A-CSI) is higher than that of another UL signal (in a case where another UL signal is SP-CSI, P-CSI, or the PUSCH), the UE performs control in such a manner that the CSI report is transmitted and another UL signal is not transmitted (for example, dropped). On the other hand, in a case where the priority of another UL signal is higher than the priority of the CSI report (A-CSI) (in a case where another UL signal is the PRACH or SR/HARQ-ACK), the UE performs control in such a manner that another UL signal is transmitted and the CSI report is not transmitted (for example, dropped).

<Priority Setting 3>

The UE may determine the priority of the CSI report (without the UL-SCH) scheduled by the DCI corresponding to the first traffic type based on information notified or obtained from physical layer signaling. The information notified or obtained from the physical layer signaling may be information notified by a DCI field, information obtained from the RNTI type, information obtained from the control resource set or a search space set, or information obtained from the DCI format.

For example, the DCI field for triggering the CSI report may include information regarding the priority of the CSI report. Alternatively, the UE may determine the priority of the CSI report based on at least one of the RNTI type corresponding to (or applied to) the DCI that triggers the CSI report, the control resource set, the search space, or the DCI format. In this case, the RNTI type, the control resource set, the search space, or the DCI format may be associated with a given priority according to the type, the index, or the like.

In a case where it is notified or determined that the priority of the CSI report is high (for example, the CSI report has a higher priority than given UL transmission for the second traffic type), the UE may perform control in the same manner as in the first aspect or the priority setting 1. Otherwise, (for example, in a case where it is not notified or determined that the CSI report has a higher priority than the given UL transmission for the second traffic type), the US may perform control in the same manner as in the priority setting 2.

In this manner, notification of the priority of the CSI can be dynamically made by determining the priority using the DCI or the like that triggers the CSI report.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 5:
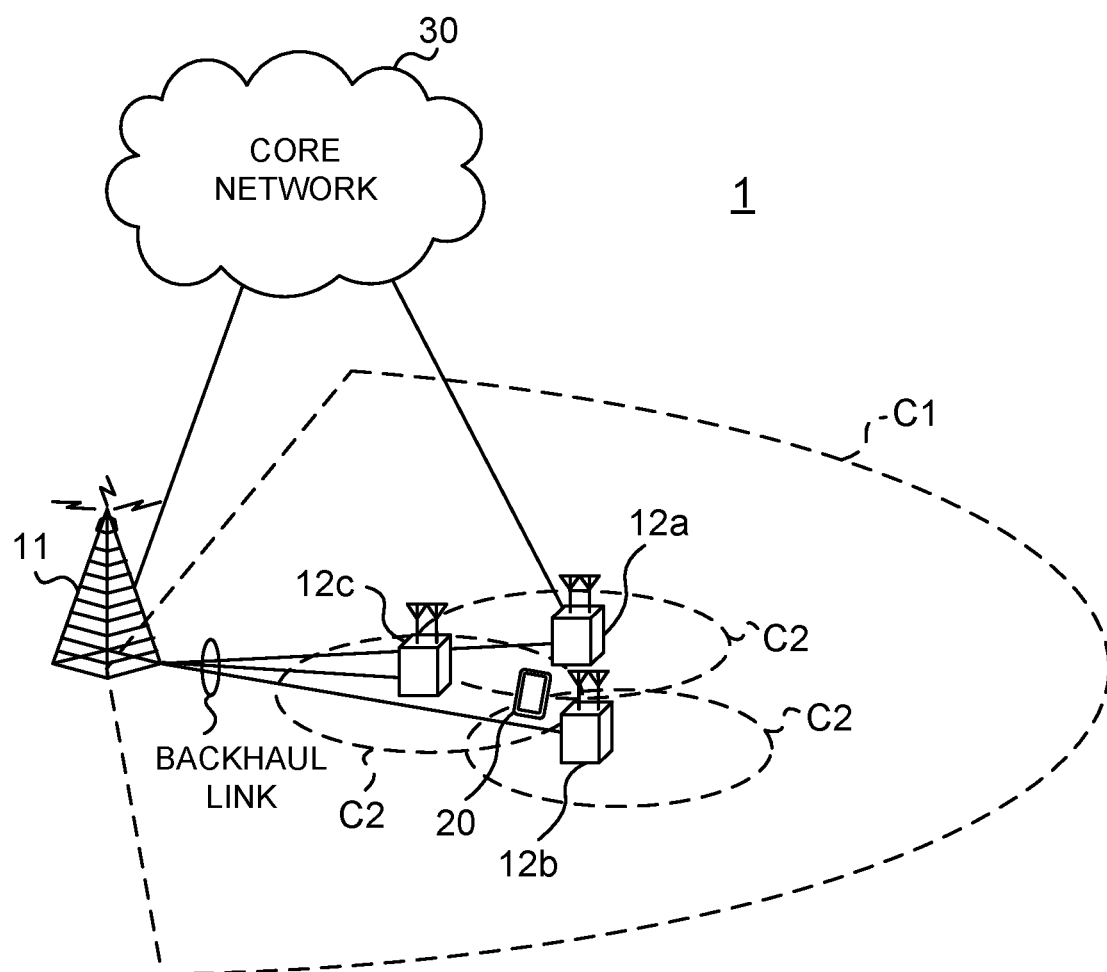
FIG. 5 is a diagram illustrating an example of a schematic configuration of a radio communication system according to one embodiment.

FIG. 5 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) or a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) or frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), or the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space based on search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that the DMRS may be referred to as a UE-specific reference signal.

(Base Station)

Figure 6:
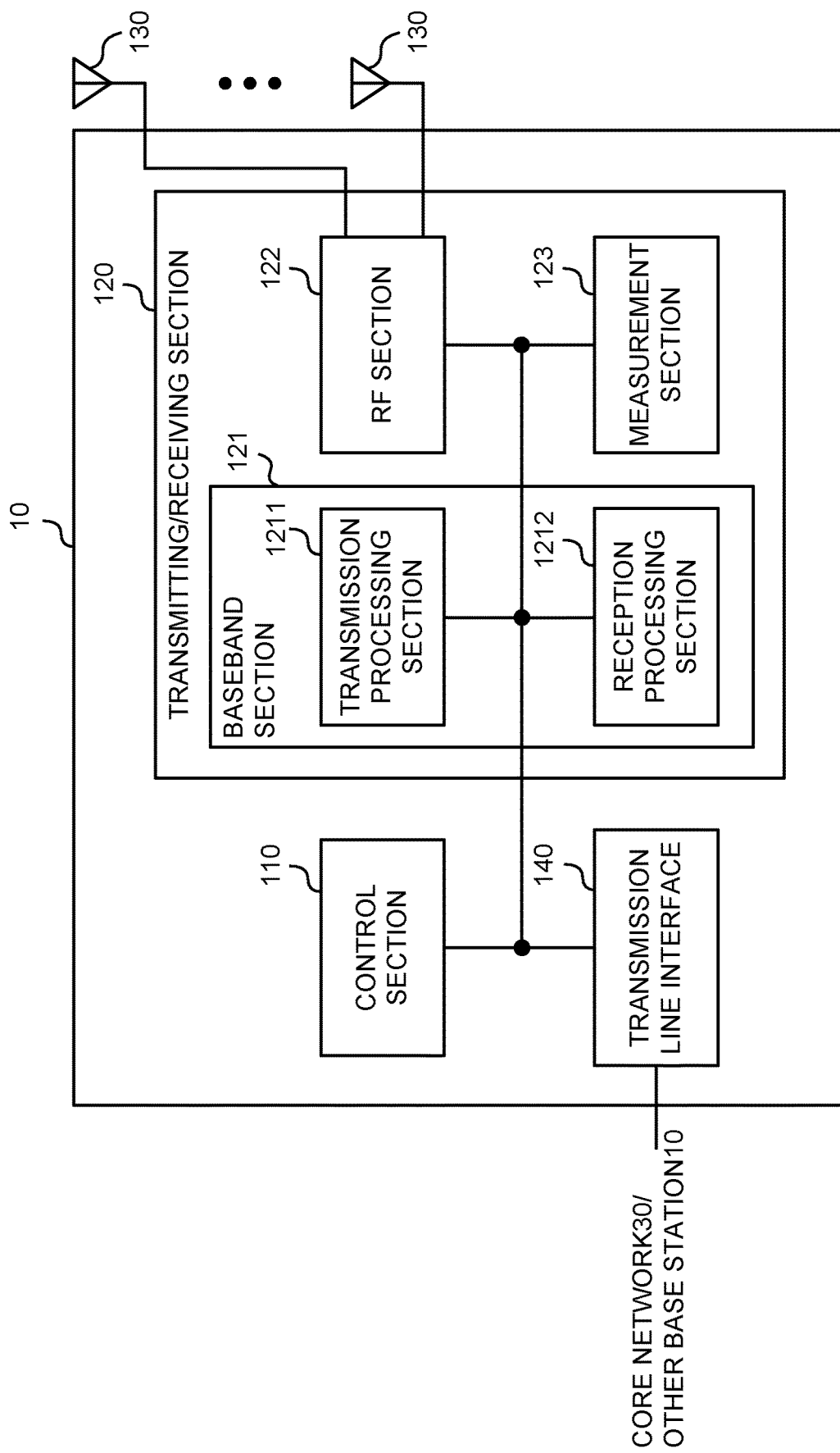
FIG. 6 is a diagram illustrating an example of a configuration of a base station according to one embodiment.

FIG. 6 is a diagram illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like, which are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna, which is described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, and may transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, or the transmission line interface 140.

In a case where transmission of the CSI report and transmission of another UL signal overlap with each other, the transmitting/receiving section 120 may receive one of the CSI report and another UL signal to be transmitted based on a given priority. The transmitting/receiving section 120 may transmit information regarding the priority of the CSI report.

The control section 110 may determine or set the priority of the CSI report based on at least one of a type of downlink control information triggering the CSI report, a parameter used for transmission of the downlink control information, and the presence or absence of UL data allocated to an uplink shared channel used for transmission of the CSI report.

(User Terminal)

Figure 7:
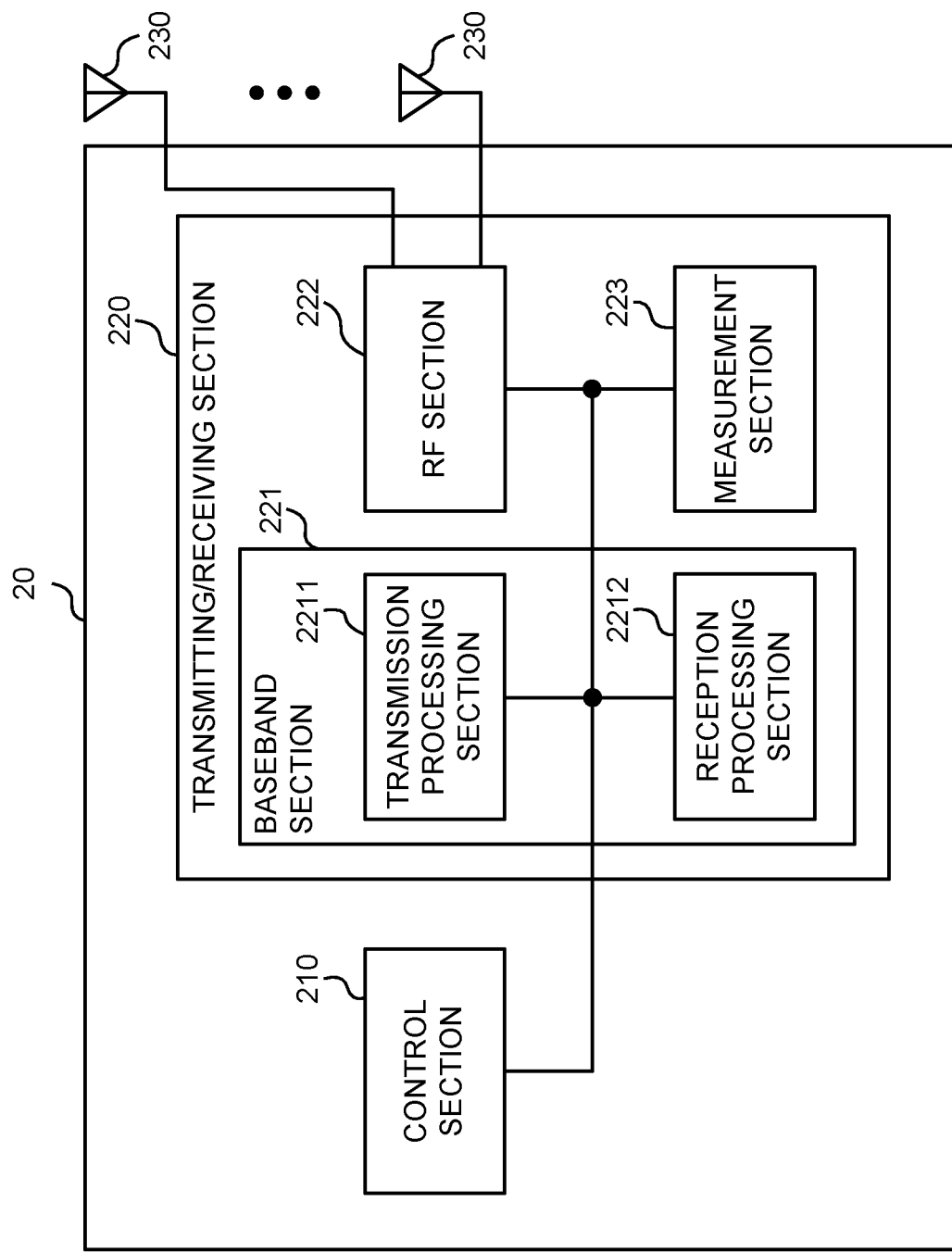
FIG. 7 is a diagram illustrating an example of a configuration of a user terminal according to one embodiment.

FIG. 7 illustrates an example of a configuration of the user terminal according to one embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like, which are described based on common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

Note that in a case where transmission of the CSI report and transmission of another UL signal overlap with each other, the transmitting/receiving section 220 may transmit one of the CSI report and another UL signal to be transmitted based on a given priority. The transmitting/receiving section 220 may receive the information regarding the priority of the CSI report.

The control section 210 may determine the priority of the CSI report based on at least one of the type of the downlink control information triggering the CSI report, the parameter used for transmission of the downlink control information, and the presence or absence of the UL data allocated to the uplink shared channel used for transmission of the CSI report.

In a case where the UL data is allocated to the uplink shared channel used for transmission of the CSI report, the control section 210 may determine that the priority of the CSI report is the same as a priority of the scheduled uplink shared channel.

In a case where the UL data is not allocated to the uplink shared channel used for transmission of the CSI report, the control section 210 may determine that the priority of the CSI report is the same as a priority of the scheduled uplink shared channel.

The priority of the CSI report in a case where the UL data is allocated to the uplink shared channel used for transmission of the CSI report and the priority of the CSI report in a case where the UL data is not allocated to the uplink shared channel used for transmission of the CSI report may be separately set.

In a case where the UL data is not allocated to the uplink shared channel used for transmission of the CSI report, the control section 210 may determine that the priority of the CSI report is the same as that of the aperiodic CSI report in the existing system (for example, Rel. 15) or other traffic types.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a wireless manner, or the like, for example) and using these apparatuses. The functional block may be implemented by combining the one device or the plurality of devices with software.

Here, the functions include determination, judging, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like, but are not limited to these. For example, a functional block (component) that has a transmission function may be referred to as a transmitting section (transmitting unit), a transmitter, and the like. In any case, as described above, the implementation method is not particularly limited.

Figure 8:
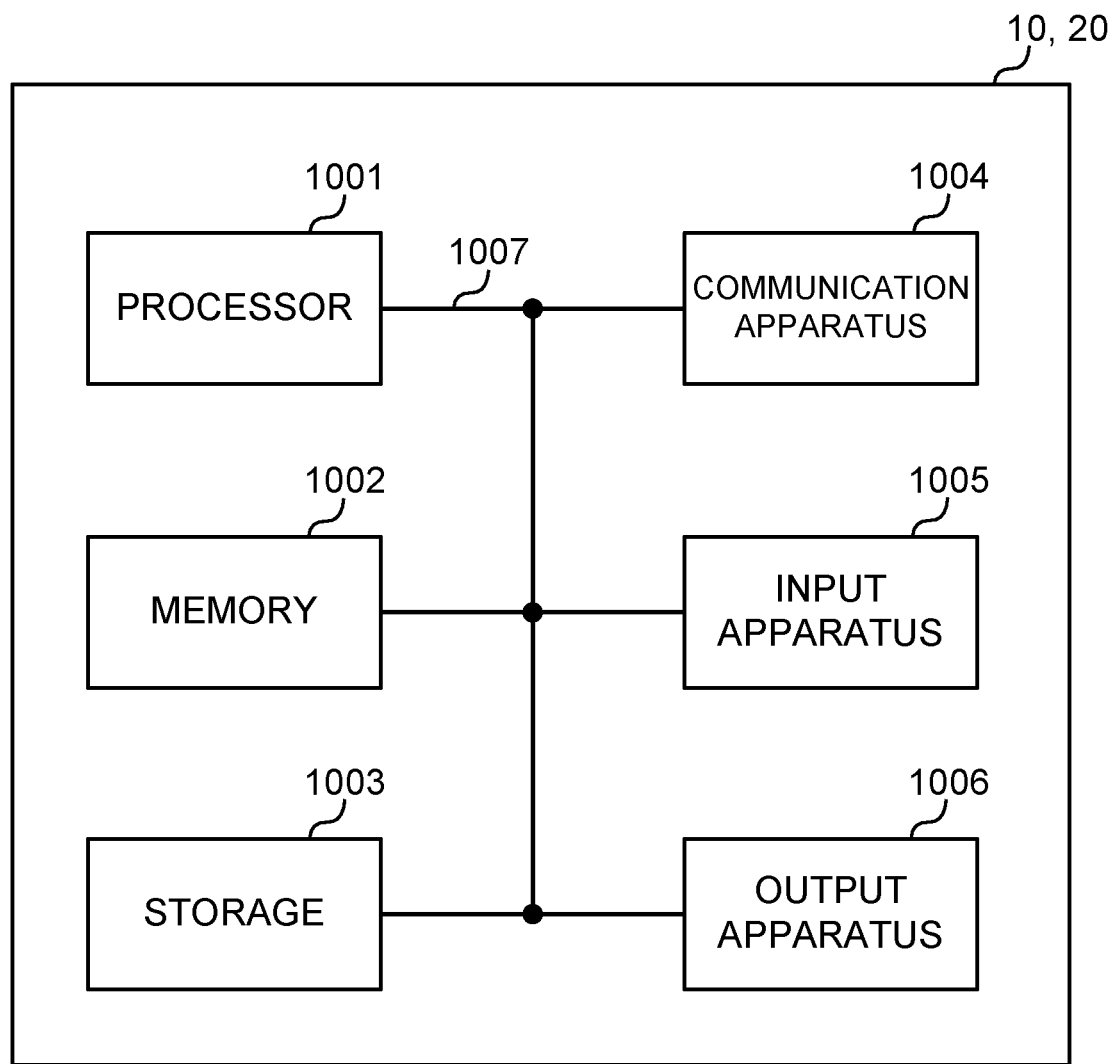
FIG. 8 is a diagram illustrating an example of a hardware configuration of the base station and the user terminal according to one embodiment.

For example, the base station, the user terminal, or the like according to one embodiment of the present disclosure may function as a computer that executes the processing of the radio communication method in the present disclosure. FIG. 8 illustrates an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

In the present disclosure, the terms such as an apparatus, a circuit, a device, a section, or a unit can be replaced with each other. The hardware configuration of the base station 10 and the user terminal 20 may include one or more of each of the apparatuses illustrated in the drawings, or does not have to include some apparatuses.

For example, although only one processor 1001 is illustrated, a plurality of processors may be provided. Further, the processing may be executed by one processor, or the processing may be executed by two or more processors simultaneously or sequentially, or by using other methods. The processor 1001 may be implemented by one or more chips.

Each of functions of the base station 10 and the user terminal 20 is, for example, implemented by causing predetermined software (program) to be read on hardware such as the processor 1001 or the memory 1002 to thereby cause the processor 1001 to perform operation, control communication via the communication apparatus 1004, and control at least one of reading or writing of data from or in the memory 1002 and the storage 1003.

The processor 1001 may control the entire computer by operating, for example, an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program code), software modules, data, and so on from at least one of the storage 1003 or the communication apparatus 1004 into the memory 1002, and executes various types of processing according to these. As the program, a program that causes a computer to execute at least a part of the operation described in the above-described embodiment is used. For example, the control section 110 (210) may be implemented by a control program that is stored in the memory 1002 and that operates on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like, which are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented in a physically or logically separated manner by the transmitting section 120a (220a) and the receiving section 120b (220b).

The input apparatus 1005 is an input device that receives input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, or the like). Note that the input apparatus 1005 and the output apparatus 1006 may be integrated with each other (for example, a touch panel).

Further, these apparatuses such as the processor 1001 and the memory 1002 are connected to each other by the bus 1007 to communicate information. The bus 1007 may be configured by using a single bus, or may be configured by using a different bus for each apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by at least one of these pieces of hardware.

(Modification)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, and the like.

The slot may include one or more symbols in the time domain (orthogonal frequency division multiplexing (OFDM) symbols, single carrier frequency division multiple access (SC-FDMA) symbols, and the like). Also, the slot may be a time unit based on the numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

The radio frame, the subframe, the slot, the mini slot, and the symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be interchangeable.

For example, one subframe may be referred to as a TTI, a plurality of consecutive subframes may be referred to as a TTI, or one slot or one mini slot may be referred to as a TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and the like, instead of a "subframe".

Here, the TTI refers to the minimum time unit of scheduling in radio communication, for example. For example, in the LTE system, a base station performs scheduling to allocate radio resources (a frequency bandwidth, transmit power, and the like that can be used in each user terminal) to each user terminal in TTI units. Note that the definition of the TTI is not limited thereto.

The TTI may be the transmission time unit of channel-encoded data packets (transport blocks), code blocks, codewords, or the like, or may be the unit of processing in scheduling, link adaptation, or the like. Note that when the TTI is given, a time interval (for example, the number of symbols) in which the transport block, the code block, the codeword, or the like is actually mapped may be shorter than the TTI.

Note that, when one slot or one mini slot is referred to as a "TTI," one or more TTIs (that is, one or more slots or one or more mini slots) may be the minimum time unit of scheduling. Also, the number of slots (the number of mini slots) to constitute this minimum time unit of scheduling may be controlled.

A TTI having a time duration of 1 ms may also be referred to as a usual TTI (TTI in 3GPP Rel. 8 to 12), a normal TTI, a long TTI, a usual subframe, a normal subframe, a long subframe, a slot, or the like. A TTI shorter than the usual TTI may be referred to as a shortened TTI, a short TTI, a partial TTI (or fractional TTI), a shortened subframe, a short subframe, a mini slot, a subslot, a slot, or the like.

Note that the long TTI (for example, the usual TTI, subframe, or the like) may be replaced with a TTI having a time duration exceeding 1 ms, and the short TTI (for example, the shortened TTI or the like) may be replaced with a TTI having a TTI length less than the TTI length of the long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on the numerology.

Also, the RB may include one or more symbols in the time domain, and may be one slot, one mini slot, one subframe, or one TTI in length. One TTI, one subframe, and the like each may include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource region of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. The PRB may be defined in a certain BWP and be numbered within the BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a given signal/channel outside the active BWP. Note that "cell", "carrier", and the like in the present disclosure may be replaced with "BWP".

Note that structures of the radio frame, subframe, slot, mini slot, symbol, and the like described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, information, a parameter, or the like described in the present disclosure may be represented in absolute values, represented in relative values with respect to given values, or represented by using other corresponding information. For example, the radio resource may be indicated by a given index.

Names used for the parameters and the like in the present disclosure are not restrictive names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using a variety of different technologies. For example, data, instructions, commands, information, signals, bits, symbols, chips, and the like all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers or a direction from lower layers to higher layers. Information, signals, and the like may be input and output via a plurality of network nodes.

The information, signals, and the like that are input and output may be stored in a specific location (for example, in a memory), or may be managed in a control table. The information, signals, and the like to be input and output can be overwritten, updated, or appended. The output information, signals, and the like may be deleted. The information, signals, and the like that are input may be transmitted to other apparatuses.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Further, notification of given information (for example, notification of "being X") is not limited to explicit notification but may be performed implicitly (for example, by not performing notification of the given information or by performing notification of another piece of information).

Judging may be made in values represented by one bit (0 or 1), may be made in Boolean values that represent true or false, or may be made by comparing numerical values (for example, comparison with a given value).

Regardless of whether or not being referred to as software, firmware, middleware, a microcode, a hardware description language, or other names, software should be widely interpreted so as to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, the software, instruction, information, and the like may be transmitted and received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology or the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station or the mobile station may be referred to as a transmitting apparatus, a receiving apparatus, a radio communication apparatus, and the like. Note that at least one of the base station or the mobile station may be a device mounted on a moving body, a moving body itself, and the like. The moving body may be a transportation (for example, a car, an airplane, or the like), an unmanned moving body (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The term "on the basis of" used in the present disclosure does not mean "only on the basis of" unless otherwise specified. In other words, the phrase "on the basis of" means both "only on the basis of" and "on the basis of at least"

Any reference to an element using designations such as "first" and "second" used in the present disclosure does not generally limit the amount or order of these elements. These designations can be used in the present disclosure, as a convenient way of distinguishing between two or more elements. In this way, reference to the first and second elements does not mean that only two elements may be employed, or that the first element has to precede the second element in some way.

The term "determining" as used in the present disclosure may include a wide variety of operations. For example, "determining" may be regarded as judging, calculating, computing, processing, deriving, investigating, looking up, search, inquiry (for example, looking up in a table, database, or another data structure), ascertaining, and the like.

Furthermore, "determining" may be regarded as receiving (for example, receiving of information), transmitting (for example, transmitting of information), inputting, outputting, accessing (for example, accessing data in a memory), and the like.

Further, "determining" may be regarded as resolving, selecting, choosing, establishing, comparing, and the like. That is, "determining" may be regarded as a certain operation.

Furthermore, "determining" may be replaced with "assuming", "expecting", "considering", and the like.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the phrase may mean that "A and B are different from C". Terms such as "leave", "coupled", or the like may also be interpreted in the same manner as "different".

In a case where terms such as "include", "including", or a variation of these are used in the present disclosure, these terms are intended to be inclusive similarly to a case where "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Thus, the description of the present disclosure is for the purpose of explaining examples and does not bring any limiting meaning to the invention according to the present disclosure.

The invention claimed is:

1. A terminal comprising:
   a receiver that receives downlink control information which triggers a channel state information (CSI) report using an uplink shared channel; and
   a processor that, when a transmission of the CSI report and a transmission of another UL signal overlap with each other, controls, based on a priority determined from the downlink control information, to transmit one of the CSI report and the another UL signal,
   wherein a priority of the CSI report in a case where UL data is allocated to the uplink shared channel and a priority of the CSI report in a case where UL data is not allocated to the uplink shared channel can be configured separately.

2. The terminal according to claim 1, wherein the processor determines, based on a field included in the downlink control information, whether the priority of the CSI report is a first priority or a second priority which is lower than the first priority.

3. The terminal according to claim 1, wherein when the priority of the CSI report and the priority of another CSI report are same, the processor controls a transmission of an UL signal based on a predefined priority based on CSI feedback methods.

4. A radio communication method for a terminal, comprising:
   receiving downlink control information which triggers a channel state information (CSI) report using an uplink shared channel; and
   when a transmission of the CSI report and a transmission of another UL signal overlap with each other, controlling, based on a priority determined from the downlink control information, to transmit one of the CSI report and the another UL signal,
   wherein a priority of the CSI report in a case where UL data is allocated to the uplink shared channel and a priority of the CSI report in a case where UL data is not allocated to the uplink shared channel can be configured separately.

5. A base station comprising:
a transmitter that transmits downlink control information which triggers a channel state information (CSI) report using an uplink shared channel; and
a processor that, when a transmission of the CSI report and a transmission of another UL signal overlap with each other, controls, based on a priority determined from the downlink control information, to receive one of the CSI report and the another UL signal,
wherein a priority of the CSI report in a case where UL data is allocated to the uplink shared channel and a priority of the CSI report in a case where UL data is not allocated to the uplink shared channel can be configured separately.

6. A system comprising a terminal and a base station, wherein
the terminal comprising:
a receiver that receives downlink control information which triggers a channel state information (CSI) report using an uplink shared channel; and
a processor that, when a transmission of the CSI report and a transmission of another UL signal overlap with each other, controls, based on a priority determined from the downlink control information, to transmit one of the CSI report and the another UL signal, and
the base station comprising:
a transmitter that transmits the downlink control information; and
a processor that, when a transmission of the CSI report and a transmission of another UL signal overlap with each other, controls, based on a priority determined from the downlink control information, to receive one of the CSI report and the another UL signal,
wherein a priority of the CSI report in a case where UL data is allocated to the uplink shared channel and a priority of the CSI report in a case where UL data is not allocated to the uplink shared channel can be configured separately.

7. The terminal according to claim 2, wherein when the priority of the CSI report and the priority of another CSI report are same, the processor controls a transmission of an UL signal based on a predefined priority based on CSI feedback methods.

* * * * *